United States Patent [19]

Hansen

[11] Patent Number: 5,502,959
[45] Date of Patent: Apr. 2, 1996

[54] TEDDER WITH ADJUSTABLE RAKE ROTORS

[75] Inventor: Jens C. Hansen, Kerteminde, Denmark

[73] Assignee: Kverneland Taarup AS, Kerteminde, Denmark

[21] Appl. No.: 295,682

[22] PCT Filed: Feb. 25, 1993

[86] PCT No.: PCT/DK93/00066

§ 371 Date: Oct. 20, 1994

§ 102(e) Date: Oct. 20, 1994

[87] PCT Pub. No.: WO93/16583

PCT Pub. Date: Sep. 2, 1993

[30] Foreign Application Priority Data

Feb. 26, 1992 [DK] Denmark ................. 0244/92

[51] Int. Cl.[6] ................. A01D 78/10
[52] U.S. Cl. ................. 56/370; 56/380
[58] Field of Search ................. 56/365, 366, 370, 56/379, 380, 377

[56] References Cited

U.S. PATENT DOCUMENTS

| | | | |
|---|---|---|---|
| 3,546,867 | 12/1970 | Hauser-Lienhard | 56/370 |
| 3,640,056 | 2/1972 | Maier et al. | 56/370 |
| 3,948,028 | 4/1976 | Reber | 56/365 |
| 4,149,364 | 4/1979 | Aron | 56/366 |
| 4,926,619 | 5/1990 | Ungruh et al. | 56/377 X |
| 5,111,636 | 5/1992 | Quirin | 56/370 X |

FOREIGN PATENT DOCUMENTS

| | | |
|---|---|---|
| 64884 | 10/1946 | Denmark . |
| 122783 | 4/1972 | Denmark . |
| 1202554 | 10/1965 | Germany . |
| 2545712 | 4/1977 | Germany . |
| 2613027 | 4/1979 | Germany . |
| 490786 | 7/1970 | Switzerland . |
| 1379505 | 1/1975 | United Kingdom . |

*Primary Examiner*—George A. Suchfield
*Attorney, Agent, or Firm*—Jacobson, Price, Holman & Stern

[57] ABSTRACT

A hay tedder adapted to be supported from a tractor and which includes a plurality of raking rotors supported for rotation about generally vertical, inclined axes. The tedder includes a main frame for connection with the tractor and a carrier beam pivotally supported from the main frame with the rake rotors being supported from the carrier beam and also supported from travelling wheels. An angle adjustment mechanism is provided to change the inclination of the rake rotors to obtain optimum spreading of the hay or grass crop. The structural association of components enables adjustment of the angle of the rake rotors to be automatically accompanied by a corresponding height adjustment of the travelling wheels which support the rake rotors thereby avoiding the necessity of independently adjusting the rake rotors and travelling wheels.

6 Claims, 3 Drawing Sheets

TEDDER WITH ADJUSTABLE RAKE ROTORS

BACKGROUND OF THE INVENTION

1. Field of the Invention

The invention concerns a tedder of the type having a main frame for connection with a tractor and a carrier beam pivotally supported from the main frame for pivoting about a horizontal axis. A plurality of rake rotors are rotatably supported from the carrier beam with each rotor also being supported by a travelling wheel having a height adjustment with respect to the carrier beam which has an angle adjustment mechanism. In such a tedder the angle adjustment mechanism for pivoting the carrier beam makes it possible to change the inclination of the rake rotors with respect to the travelling direction to obtain optimum spreading of the mown grass crop. Height adjustment means for the travelling wheels make it possible to change the inclination of the rake rotors such that the desired height of the rake springs above the ground is maintained constantly in the direction of forward travel.

2. Description of the Prior Art

In the known tedders of the present type the angle adjustment and the height adjustment are effected independently of each other, e.g. by means of hydraulic cylinders as shown and described in DE-B2-26 13 027, or by means of screw spindles and cord drives as shown and described e.g. in DE-C2-25 45 712.

SUMMARY OF THE INVENTION

The object of the invention is to provide a tedder of the present type which is so adapted that adjustment of the angle of the rake rotors is automatically accompanied by a corresponding height adjustment of the travelling wheels.

This object is achieved by an angle lever pivotally mounted on the carrier beam such that the axis of rotation of the angular lever is displaced when the carrier beam is pivoted to change the angle, and is rotated because of the connection of one arm with a point fixed with respect to the main frame such that the height adjustment means is displaced to change the wheel height. This adjustment can be performed from the cab of the tractor in the operation of the tedder.

BRIEF DESCRIPTION OF THE DRAWINGS

The invention will be explained more fully below with reference to the drawing, in which.

DESCRIPTION OF THE PREFERRED EMBODIMENTS

Figure 1:
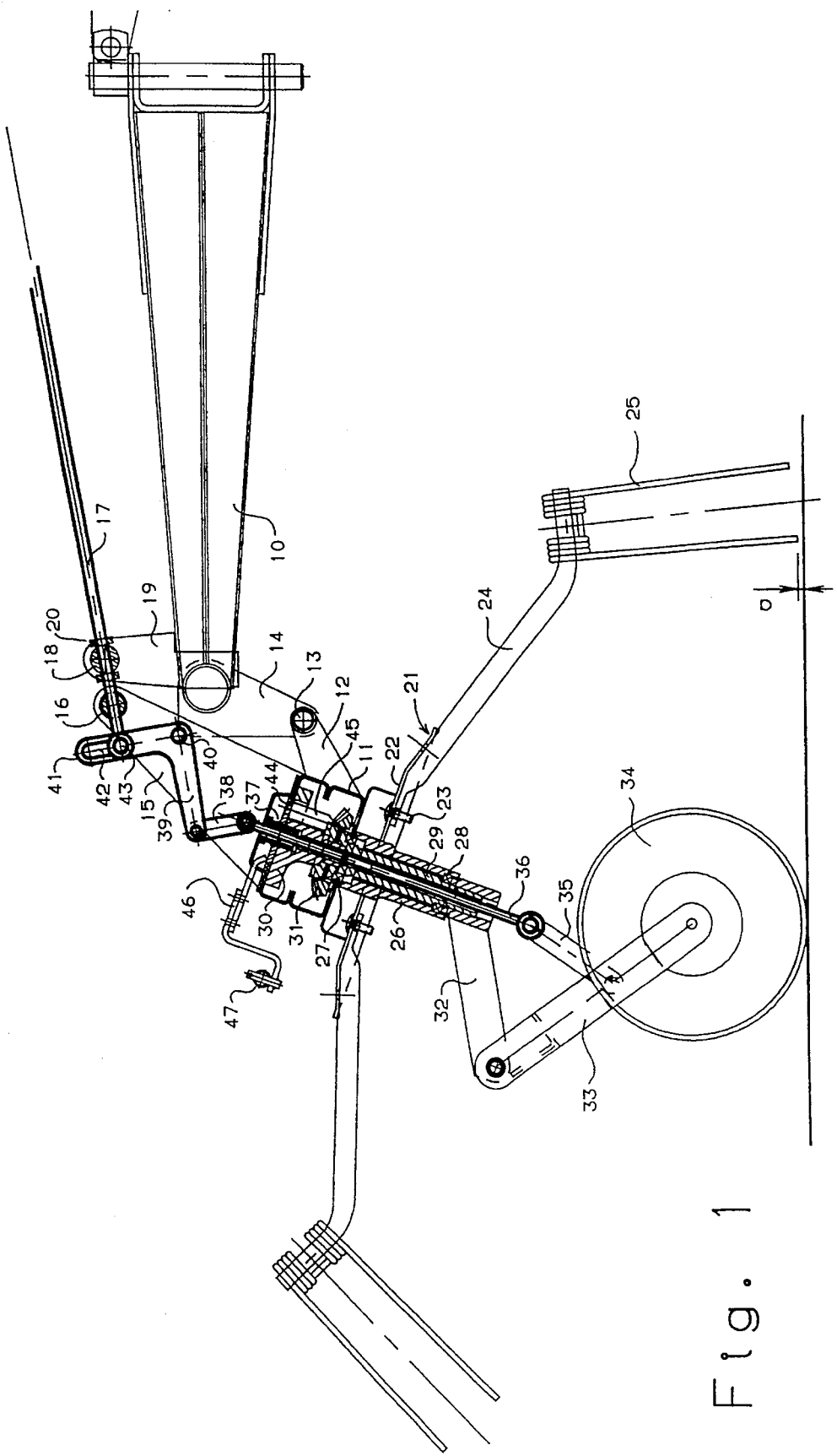
FIG. 1 is a vertical, partially sectional view of an embodiment of the tedder of the invention with a divided drive shaft.

In FIG. 1, 10 is a part of a main frame which is adapted to be suspended from the three-point suspension of a tractor in a generally known, not shown manner. A hollow carrier beam 11, which has a substantially rectangular cross-section and extends perpendicularly to the travelling direction in the entire length of the tedder, is pivotally suspended from the main frame 10 by means of arms 12, which are rotatable about a shaft 13 extending between nose members 14 on the main frame. An upwardly extending, angular bracket 15 is secured on the upper side of the carrier beam 11, and a nut 16 is rotatably arranged at the outer end of the bracket. A screw spindle 17, which can be rotated from the cab of the tractor in a manner not shown, extends smoothly through a sleeve 18 which is rotatably mounted in an upstanding bracket 19 secured to the main frame 10. A lock disc 20 is secured on both sides of the sleeve 18 on the screw spindle 17, preventing axial displacement of the screw spindle which extends threadedly through the nut 16. The advantage of the mechanism described above is that the carrier beam 11 can pivot about the shaft 13 by rotation of the screw spindle 17.

A plurality of rake rotors, only one of which is shown in the drawing, are rotatably suspended from the carrier beam. The rake rotor, which is generally designated by 21, has a hub disc 22 mounting, e.g. by means of screws or rivets 23, a plurality of arms 24 which carry rake means 25. The hub disc 22 is secured on a hollow shaft 26 which is rotatably mounted by means of ball bearings 27 and 28 on another hollow shaft 29, whose uppermost part located inside the carrier beam 11 is rotatably, but axially immovably arranged on the lower, pin-shaped end of a carrier block 30, which is in the form of a body of revolution and whose upper part forms a flange which is secured to the top wall of the beam. Also the upper end of the hollow shaft 26 extends through an opening in the beam bottom, and this end part mounts a crown wheel 31 which is located inside the beam and which is engaged with a bevel pinion (not shown) on drive shaft sections (not shown) extending in the longitudinal direction of the beam to their respective adjacent rotors. One of the drive shaft sections is drivingly connected with the power take-off of the tractor through a transmission mechanism (not shown) so that the rake rotors can be driven from this.

The lower end of the inner hollow shaft 29 mounts an arm 32 on whose outer end a wheel fork 33, which carries an air rubber wheel 34, is pivotally secured. The wheel fork 33 is connected through a link 35 with the lower end of a rod 36, which extends through and is slidable in the hollow shaft 29 and a central bore in the carrier block 30 as well as a sleeve 37 rotatably mounted in a cylindrical recess in the upper side of the block. The upper end of the rod 36 positioned above the carrier beam 11 is connected through a link 38 with one arm 39 of an angle lever, which is pivotally mounted on the bracket 15 at a pivot 40, and whose other arm 41 is provided with a slot 42 which rotatably and slidably receives a pin 43 which is rotatably mounted on the end of the screw spindle 17.

When the inclination of the rake rotors is changed by rotating the screw spindle 17, e.g. in a direction such that the nut 16 is moved outwardly on the spindle, the carrier beam 11 pivots about the shaft 13 so that the angle of the rotor axes with the vertical is reduced. Since the pivot 40 of the angle lever participates in the pivotal movement of the beam, while the pin 43 connected with the angle lever 41 is stationary, the angle lever is simultaneously rotated clockwise, thereby lifting the rod 36 and the wheel 34. This compensates for the increase in the minimum distance a of the rake means 25 from the ground, which is caused by the change in the angle of the rotor axes with the vertical.

The rotatable sleeve 37 mounts a disc 44 which is positioned on the carrier block 30 and which is firmly connected with the upper end of the hollow shaft 29 through a bolt 45 which is parallel with the rotor axis and extends through a curved slot in the carrier block 30, the carrier arm 32 of the travelling wheel 34 being mounted on the hollow shaft 29. One end of a Z-shaped control arm 46, which extends through an opening in the beam wall, is welded on the upper side of the rotatable disc 44, and the other end of the control arm 46 is rotatably connected with a control rod 47 extending along the beam. Axial movement of this control rod thus causes the disc 44 to rotate and thereby the hollow shaft 29 carrying the wheel, which is thus steerable.

Figure 2:
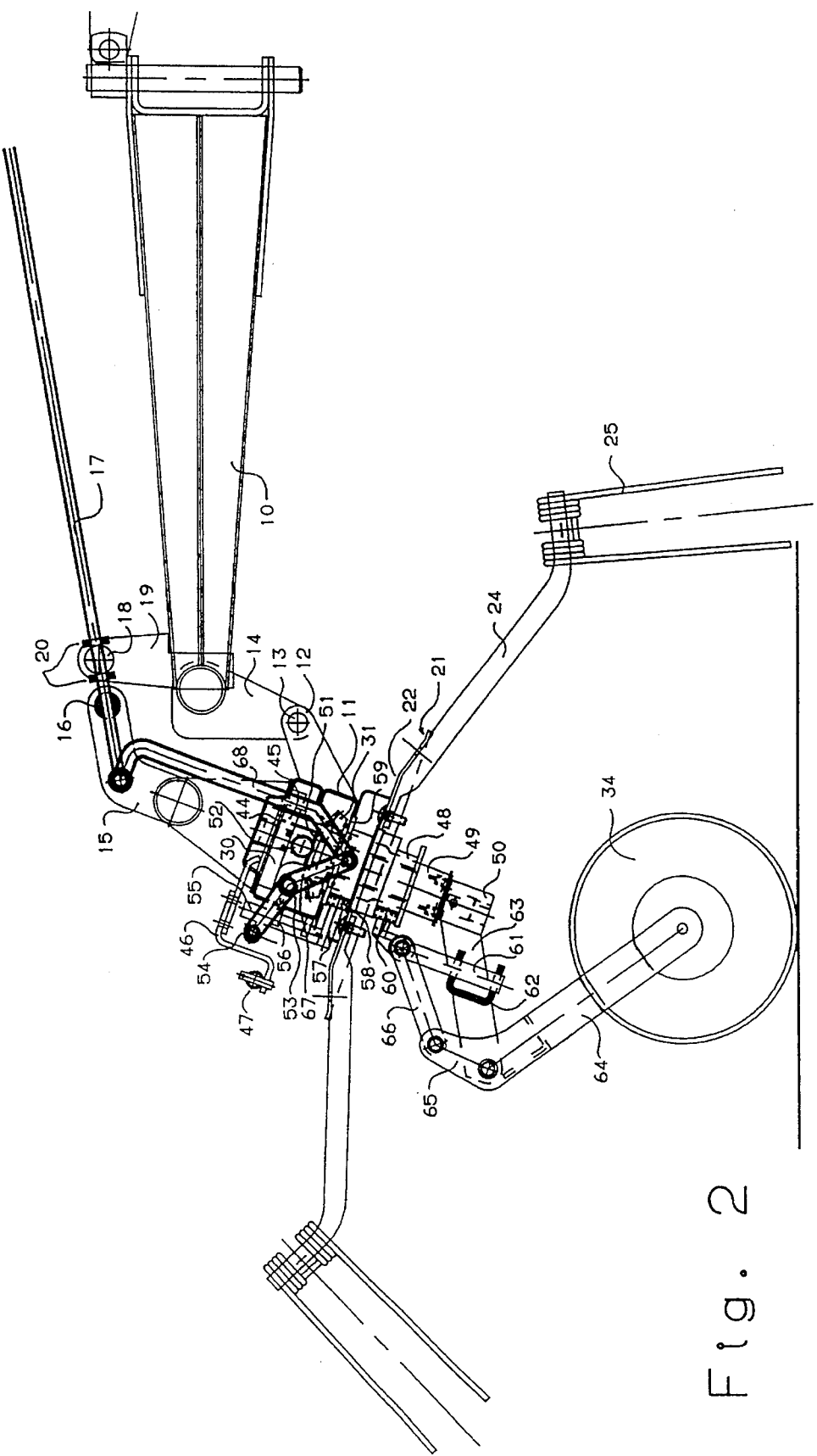
FIG. 2 is a corresponding vertical view of a second embodiment having a through-going drive shaft.

In FIG. 2 the parts corresponding to those in FIG. 1 are designated by the same reference numerals as in FIG. 1.

In the embodiment shown in FIG. 2 the hub disc 22 is secured on a round member 48 which is slidable, but fixed against rotation on a hollow rotor shaft 49, which is in turn rotatably, but axially immovably mounted on a center shaft 50, whose upper end mounts the crown wheel 31 positioned in the bottom of the carrier beam 11. The upper end of the center shaft 50 extending through the crown wheel mounts a disc 51, which is firmly connected with the rotatable disc 44 upwardly in the carrier beam and thereby with the control mechanism 46, 47 through the bolt positioned in the vicinity of the periphery.

A drive shaft 52, which is driven by the tractor in a known manner (not shown), here extends uninterruptedly through the carrier beam 11 and carries a bevel pinion (not shown) adjacent each crown wheel, said bevel pinion being engaged with the crown wheel in question to drive the hollow shaft 49 and the rake rotor 21 through the round member 48.

A control shaft 53, which extends in parallel with the drive shaft 52, is rotatably journalled in the carrier beam 11, said control shaft carrying at each rotor shaft an arm 54, which emerges through an opening in the rear wall of the beam and is thus connected with a preferably hexagonal rod 55, which is parallel with the rotor axis and is axially slidably controlled in control projections 56 on the beam, such that this rod is displaced in parallel with the rotor axis when the control shaft 53 rotates. An inwardly extending angle arm 57 on the lower end of the rod 55 carries a rotatable roller 58 on its inner end, said roller being positioned between a flange 59 on the round member 48 and the upper side of the rotor hub disc. Another roller 60 is located between two radial shoulder surfaces on the round member 48 below the rotor hub disc 22 and is rotatably mounted on an angle arm on the upper end of another preferably hexagonal rod 61, which is parallel with the rotor axis and is axially slidably guided in a cross-sectionally U-shaped guide fitting 62 on an arm 63, which is secured to and extends forwardly from the lower end of the center shaft 50. This arm 63 pivotally mounts a wheel fork 64, which carries the air rubber wheel 34 and has an angle arm 65 so connected with the rod 61 through a link 66 that the wheel fork pivots when the rod is displaced.

An additional arm 67 is secured on the guide shaft 53 opposite the screw spindle 17, said arm 67 defining together with the arms 54 an angle lever and extending down through an opening in the bottom of the carrier beam. The outer end of this arm is rotatably connected with the lower end of a double-curved articulated rod 68, which extends externally of the drive shaft 52 up through an opening in the top wall of the beam, and whose upper end is rotatably connected with the stationary end of the screw spindle 17.

If the screw spindle is rotated e.g. in such a direction that the nut 16 moves outwardly on the spindle, the carrier beam 11 pivots about the shaft 13 so that the angle of the rotor axes with the vertical is reduced. Also the distance between the nut 16 and the upper end of the articulated rod 68 is reduced, causing the lower end of said rod to exert a pull in the arm 67 and to rotate the control shaft 53 counterclockwise. The arms 54 then press the rods 55 downwards, and this movement is transferred through the rollers 58, the rotor hub discs 22, the round members 26 and the rollers 60 to the rods 61, which thereby pivot the wheel fork 64 counterclockwise through the link 66. This compensates for the increase in the minimum distance a of the rake means 25 from the ground, which is caused by the change in the angle of the rotor axes with the vertical.

Figure 3:
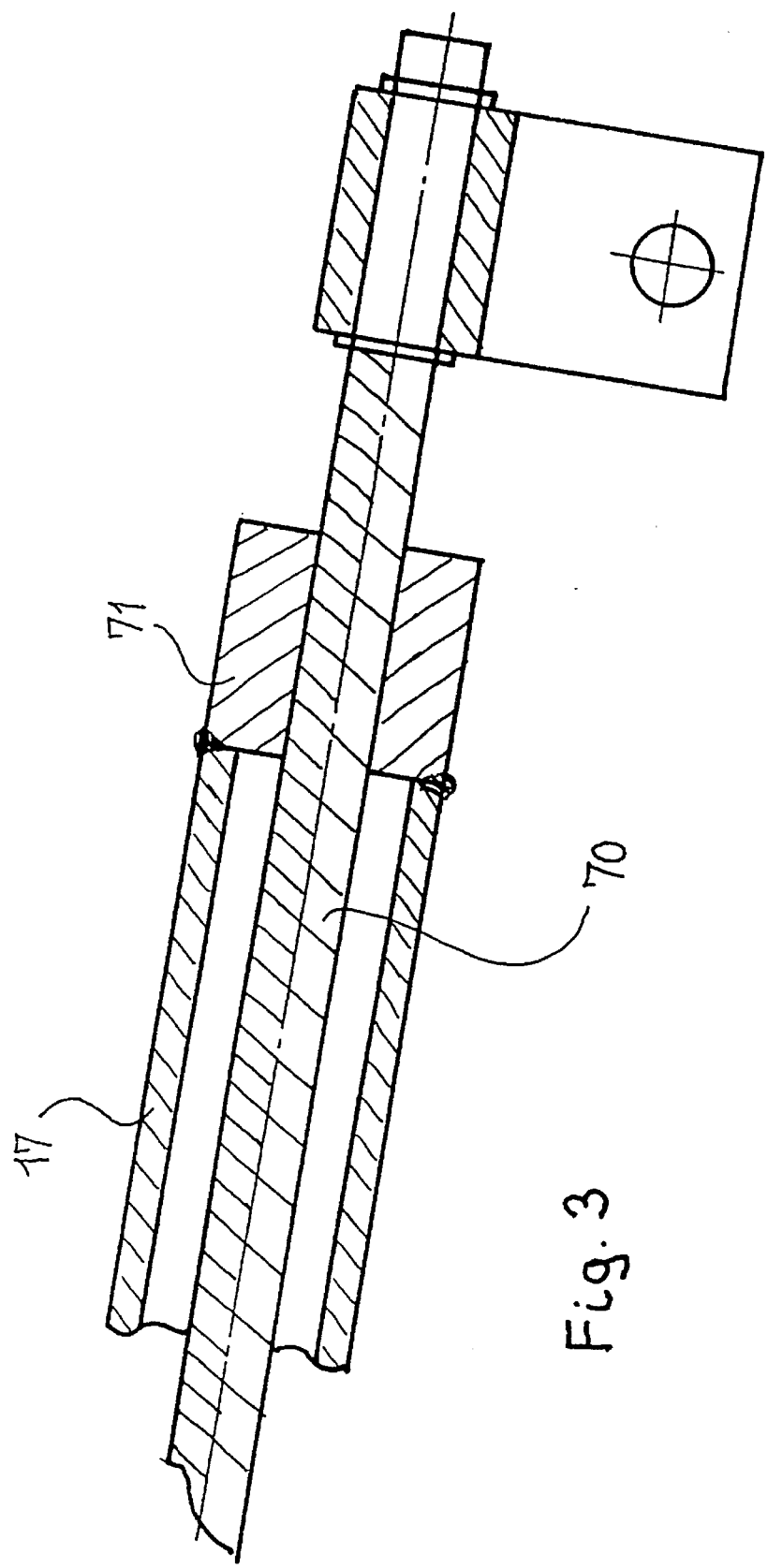
FIG. 3 is a vertical section through an amended embodiment of a part of the tedder.

In both of the two structures described above the wheel height is automatically changed as the rotor axis angle changes, the reason being that the end of the screw spindle 17 is stationary. FIG. 3 shows an amended embodiment of a part of the adjustment mechanism, enabling the wheel height to be changed independently of the rotor inclination. In this amended embodiment the screw spindle 17 is hollow and surrounds another screw spindle 70 having the same pitch, which is threadedly engaged with a nut 71 mounted on the end of the screw spindle 17. In this structure it is the end of the inner, axially adjustable screw spindle 70 which is connected with the angle lever arm 41 in FIG. 1 and with the link 68 in FIG. 2. This connection point is thus stationary here too, as long as the inner spindle does not rotate, but is adjustable.

The details of the structures shown and described can be modified in many ways within the scope of the invention.

What is claimed is:

1. A tedder having a main frame intended for suspension from a tractor and a carrier beam which is pivotally connected to said main frame for pivotal movement about a horizontal axis, a plurality of rake rotors, which are rotatable about their respective substantially vertical axes, being suspended from said carrier beam, each of said rake rotors being supported by a travelling wheel whose height position with respect to the carrier beam is adjustable by means of a height adjustment means slidable in parallel with the rotor axis, said tedder having an angle adjustment mechanism preferably activatable from the driver's seat of the tractor to pivot the carrier beam, characterized by an angle lever which is rotatable about an axis stationary with respect to the carrier beam, one arm of said angle lever being connected with a member, said member being part of the angle adjustment mechanism and stationary with respect to the main frame, so that movement of the carrier beam with respect to the main frame causes rotation of the angle lever, the other arm of said angle lever being connected with the height adjustment means for displacing said height adjustment means and travelling wheel upon rotation of the angle lever.

2. A tedder according to claim 1, characterized in that the connection between said one arm of the angle lever and the member stationary with respect to the main frame is established by means of a link arranged between said one arm and the stationary member.

3. A tedder according to claim 1, characterized in that the connection between said one arm of the angle lever and the member stationary with respect to the main frame is established by a slot in said one arm receiving a pin which is firmly connected with the stationary member.

4. A tedder according to claim 1, characterized in that the carrier beam includes a support arm having one end secured to said carrier beam, the other end of said support arm being pivotally secured to the main frame, and a second upwardly extending support arm secured to the carrier beam, said second support arm including a rotatably mounting nut, said member forming part of the angle adjustment mechanism including a threaded spindle engaged with said nut to adjust the carrier beam when the threaded spindle is rotated.

5. A tedder according to claim 1, wherein the carrier beam contains a through drive shaft for operating the rake rotors, characterized in that said one arm of the angle lever is firmly mounted on a control shaft, which is rotatably journalled in the carrier beam and extends in parallel relation with the drive shaft past all the rotors, said control shaft including an arm opposite each rotor, said arm on the control shaft being connected with a rod arranged on the exterior of the carrier beam and being slidable in parallel with the axis of the rotor, said rod being displaced by rotation of the control shaft, said rod carrying a roller in rolling contact with either of two flanges on a sleeve, which carries rotor arms and is slidable on, but fixed against rotation with respect to a rotor shaft, said flanges being located above a rotor hub disc, a second pair of flanges being provided below said disc on the sleeve, said second pair of flanges having interposed between them a second roller whose shaft is connected with the height adjustment means.

6. A tedder according to claim 1, wherein the drive shaft for the rake rotors contained in the carrier beam is divided into sections between the rotor shafts, characterized in that the rotor shafts are hollow, and that the height adjustment means are formed by a slidable rod, which is arranged in each rotor shaft and whose upper end protrudes from the carrier beam, and are firmly connected with each other and articulated to the second arm of the angle lever, which is common to all rotors.

* * * * *